United States Patent [19]

Lenz et al.

[11] 4,342,489

[45] Aug. 3, 1982

[54] BEARING LUBRICATING INJECTOR

[75] Inventors: Herman N. Lenz, Lambertville, Mich.; David A. Host, Phoenix, Ariz.

[73] Assignee: Teledyne Industries, Inc., Los Angeles, Calif.

[21] Appl. No.: 194,937

[22] Filed: Oct. 7, 1980

[51] Int. Cl.³ .............................................. F16C 33/66
[52] U.S. Cl. .................................... 308/187; 184/6.11
[58] Field of Search ......................... 308/187, DIG. 15; 184/6.11

[56] References Cited

U.S. PATENT DOCUMENTS

| | | | |
|---|---|---|---|
| 2,386,639 | 10/1945 | Stafford | 308/187 |
| 2,589,631 | 3/1952 | Schmitz | 308/187 |
| 2,762,664 | 9/1956 | Manning et al. | 308/187 |
| 2,888,302 | 5/1959 | Cox et al. | 308/187 |
| 3,085,838 | 4/1963 | Patterson | 308/187 |
| 3,264,043 | 8/1966 | Keen | 308/187 |
| 3,276,827 | 10/1966 | Diver et al. | 308/187 |
| 3,285,004 | 11/1966 | Hopley | 308/187 |
| 3,325,088 | 6/1967 | Keen et al. | 308/187 |
| 3,347,553 | 10/1967 | Schweiger | 277/27 |
| 3,360,313 | 12/1967 | Pratt et al. | 308/187 |
| 3,604,769 | 9/1971 | Latham, Jr. | 308/187 |
| 3,722,212 | 3/1973 | Stein | 184/6.11 |
| 3,746,128 | 7/1973 | Wunsch | 184/6.11 |
| 4,013,141 | 3/1977 | James | 184/6.11 |

FOREIGN PATENT DOCUMENTS 556981 12/1974 Switzerland ............... 308/DIG. 15

*Primary Examiner*—Richard R. Stearns
*Attorney, Agent, or Firm*—Gifford, VanOphem, Sheridan & Sprinkle

[57] ABSTRACT

A bearing lubricant injector comprising a first ring member secured to a shaft which is rotatably supported by a bearing adjacent the first ring member. A second ring member is secured to the first ring member by a plurality circumferentially spaced stanchions to define a lubricant flow passage which directs an axial flow of lubricant into the bearing. The radially outer surface of the first ring member is inclined upwardly toward the bearing so that rotation of the ring centrifugally forces the lubricant into the bearing.

8 Claims, 5 Drawing Figures

BEARING LUBRICATING INJECTOR

BACKGROUND OF THE INVENTION

I. Field of the Invention

The present invention relates generally to devices for lubricating bearings which rotatably support a shaft within a turbine housing and, more particularly, to such a device which centrifugally injects lubricant into the bearing as it restrains the axial position of the bearing.

II. Description of the Prior Art

Lubrication of bearings which rotatably support a shaft within a turbine housing is necessary for cooling and the reduction of friction between the bearing parts. The bearings commonly comprise ball bearings in which a plurality of balls are disposed between the outer surface of a substantially annular inner race and the inner surface of a substantially annular outer race. A bearing retainer circumferentially spaces the bearings around the races and retains the balls in position. It is the abutting surfaces of the ball and the races that must be lubricated to avoid the friction which causes heat build up and resistance to rotation.

One previously known apparatus for lubricating ball bearings comprises the use of injectors which direct a stream of lubricant toward the movable bearing parts. These injectors often comprise nozzles or tubes which direct the flow of pressurized lubricant toward the bearing. Thus, it is necessary to provide a pump or other pressurized source in order to activate the lubricant injectors. Consequently, such apparatus are quite expensive and involve a large number of components which significantly increase the weight of the turbine engine. Since the injectors are stationary and spaced from rotating elements secured to the shaft, it is difficult to accurately align the injector with respect to the bearing. Consequently, not all of the lubricant passing through the injector enters the bearing. Moreover, such devices are quite inefficient since much of the spray directed from the nozzle diverges and is wasted by being reflected from adjacent surfaces.

Another known form of device for lubricating a ball bearing and supporting a rotating shaft in a turbine housing is disclosed in U.S. Pat. No. 3,264,043 to Keen. Keen avoids the need for pumps or otherwise prime or pressurized sources by relying upon gravity and centrifugal force to lubricate the ball bearing. Keen discloses a turbine having a vertically mounted shaft in which the upper portion of the ball bearing is lubricated by fluid which is pulled downwardly through appropriate passages by gravity. The lower portion of the bearing is lubricated by an elaborate passage means defined between an annular member secured to the turbine housing and a bearing retaining member secured to the shaft adjacent the inner race of a bearing. The retaining members includes an outwardly inclined exterior surface extending upwardly toward the ball in the bearing. The radially adjacent annular member includes a helical groove likewise inclined upwardly toward the ball and is secured to an extended portion of the turbine housing. The passageway defined between the surface of the retaining member and the helical groove is fluidly connected to an adjacent passage defined by a portion of the turbine housing and a beveled surface of the inner race of the bearing. That passage is in turn coupled to an annular groove in the bearing retaining member which in turn distributes the lubricant to fluid passages in the retaining member.

Such a construction is disadvantageous in that the slant of the helical groove cooperates with the angular momentum of the centrifugally forced lubricant only when the shaft is rotated in a single direction. Moreover, the large number of passages and corresponding surfaces which contact the lubricant before it reaches the bearing reduces the cooling effect of the lubricant supplied to the bearing. In addition, since the flow imparted by the centrifugal force is not driven axially into the bearing but is redirected through a passageway angled toward the bearing, this lubricating assembly can create energy losses in the flow of lubricant and can contribute to reflection of the lubricant from the bearing surfaces.

SUMMARY OF THE PRESENT INVENTION

The present invention overcomes the above mentioned disadvantages by providing a lubricant injector which is coaxially secured about the rotating shaft of the engine adjacent to the inner race of the bearing. The injector includes a ramp surface which is inclined outwardly toward the ball supported by the inner race of the bearing and the maximum height of the ramp surface corresponds with the height of the top surface of the inner race. An annular ring is spaced slightly apart from the ramp surface of the injector and defines a narrow passage intermediate the ramp surface and the ring which axially directs the flow of lubricant between the bearing retainer and the inner race of the bearing.

The injector of the present invention provides a flow of lubricant which is highly directionalized in alignment with the space between the inner race of the bearing and the bearing retaining member. A portion of the injector also operates to retain the bearing in its axial position along the rotating shaft. In addition, the injector is operable from either side of the beaing, and therefore, can be conveniently placed on the side from which a supply of lubricant is easily accessible. Moreover, the injector will centrifugally inject lubricant into the bearing regardless of the direction of rotation of the shaft. A further advantage of the injector of the present invention is that it is easily secured to the periphery of a rotatable shaft and, thus, does not require machining of the shaft to provide hollow passages within the shaft in order to centrifugally force lubricant radially outward.

BRIEF DESCRIPTION OF THE DRAWING

The present invention will be more clearly understood by reference to the following detailed description of a preferred embodiment of the present invention, when read in conjunction with the accompanying drawing in which like reference characters refer to like parts throughout the several views, and in which.

DETAILED DESCRIPTION OF A PREFERRED EMBODIMENT OF THE PRESENT INVENTION

Figure 1:
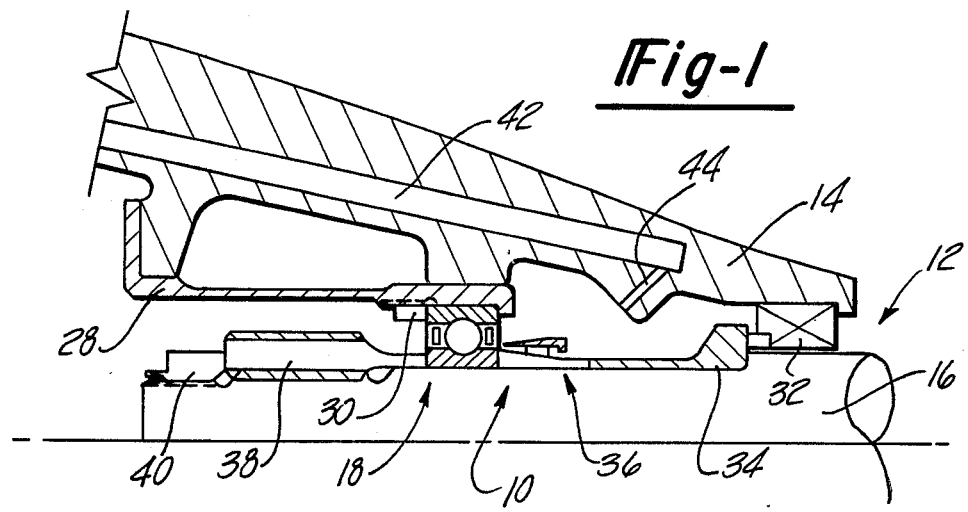
FIG. 1 is a fragmentary, sectional elevation of a turbine engine employing the lubricant injector of the present invention.
Figure 2:
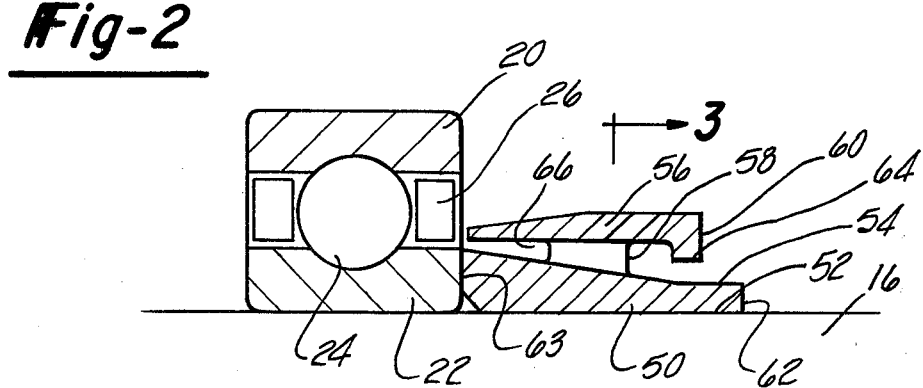
FIG. 2 is an enlarged sectional elevation of the bearing and lubricant injector shown in FIG. 1.

Referring to FIG. 1, the present invention 10 is thereshown employed in a turbine engine 12 having a housing 14 and a shaft 16 rotatably mounted in the housing by a bearing 18. As best shown in FIG. 2, the bearing 18 comprises an outer race 20, an inner race 22, a plurality of balls 24 (one shown) and a retaining member 26. Referring again to FIG. 1, the outer race 20 is retained in position by the bearing retainer 28 by means of the retaining nut 30. A seal 32, wiper 34 and injector 36 on one axial side of the inner race 22, and a coupling member 38 adjacent the other side of the inner race 22, are secured to the shaft 16 by means of the retaining nut 40. A lubricant passage 42 is formed in the housing 14 and fluidly communicates with a lubricant jet 44 to provide a flow of lubricant directed toward the injector 36 from a lubricant source (not shown).

Figure 3:
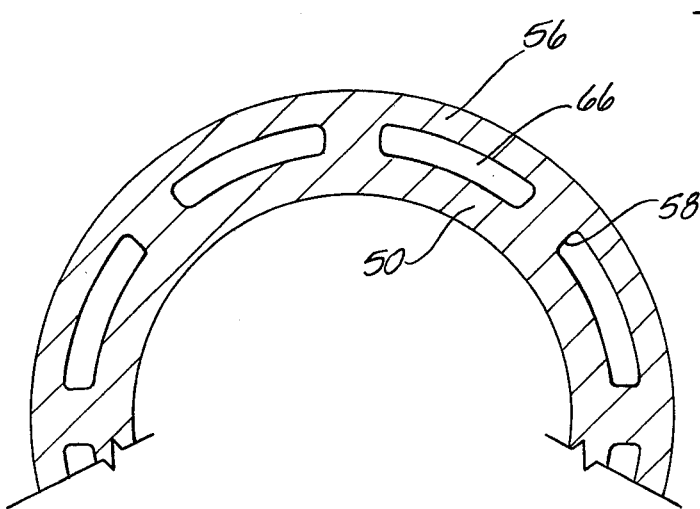
FIG. 3 is a sectional elevational view of the injector of the present invention taken substantially along the line 3—3 in FIG. 2.

Referring now to FIG. 2, the axial alignment of the injector 36 and the bearing 18 is thereshown. The injector 36 includes a first substantially annular ring 50 with its radially inner surface lying against the periphery of the shaft 16. The radially outer surface of the ring 50 is inclined outwardly toward the top surface of the inner race 22 of the bearing and supports a second substantially annular member 56 by means of the circumferentially spaced apart stanchions 58 (FIGS. 2 and 3). A first axial end 60 of the ring 56 is axially spaced from the end 62 of the ring 50 to provide an axially elongated inlet on surface 54, and includes a radially inwardly extending dam 64. The space between the dam 64 and surface 54 defines the inlet of the injector. The height of the outermost point of the surface 54 coincides with the height of the outer surface of the inner race 22. The inner radial surface of the ring 56 substantially corresponds with the height of the innermost surface of the retaining member 26. Thus, the rings 50 and 56 define a passageway 66 which is directly aligned with the clearance space between the retaining member 26 and the inner race 22 of the bearing.

Figure 4:
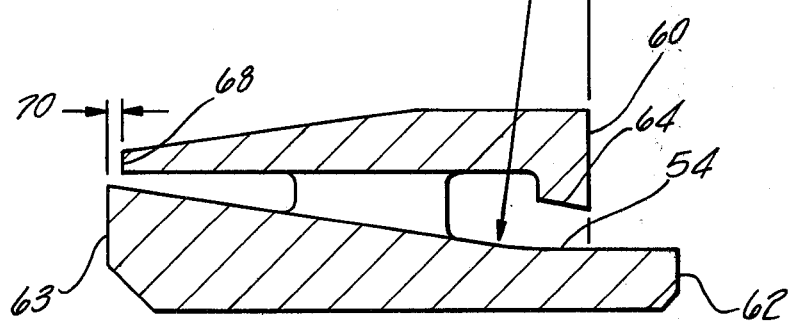
FIG. 4 is an enlarged sectional elevational view of the injector of the present invention shown in FIGS. 1 through 3.

Referring now to FIG. 4, the design of the injector can be more clearly described. In FIG. 4 it can be seen that the focal point of the radius of inclination of the surface 54 is aligned with the axial end 60 of the ring 56 so that a positive flow of oil is caused to flow by centrifugal force up the surface 54 toward the bearing 18. In addition, the surface of the dam 64 is inclined outwardly toward the bearing with a substantially smaller radius than the radius of the surface 54 in order to insure that a positive fluid flow occurs in the passage 66 from the inlet toward the outlet of the injector 36. The leading edge 68 of the ring 56 is spaced axially apart from the axial end 63 of ring 50 to provide a small tolerance 70 which compensates for the tolerance of the retaining member 26 with respect to the bearing races.

Figure 5:
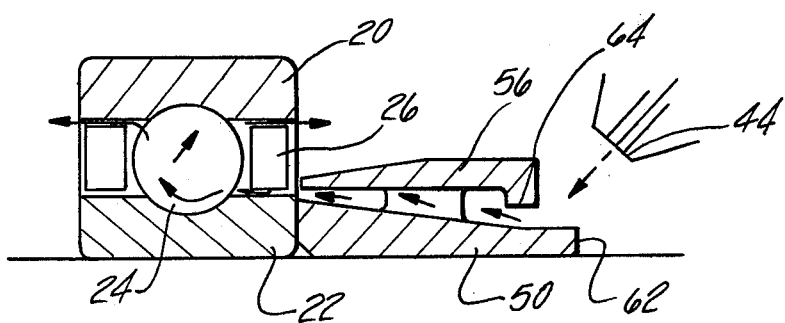
FIG. 5 is a sectional elevational view substantially the same as FIG. 2 but showing the direction of fluid flow in the injector and bearing assembly of the present invention.

The operation of the device is best shown in FIG. 5, in which the arrows disclose the flow path of the lubricant from the jet 44 through the injector 36 and axially into the bearing 18. The jet 44 forces a flow of lubricant to the inlet defined by the dam 64 and the surface 54 of ring 50. Since the shaft 16 and thus, the ring 50, are rotated by operation of the turbine engine, the lubricant is centrifugally forced along the surface 54 through the chamber 66. Since the dam 64 has a sharply radiused surface, the flow of lubricant is not restricted despite the fact that the chamber 66 is partly diverted around the stanchions 58. As the chamber 66 converges at the ends 68 and 63 of the rings 56 and 50, respectively, the flow of lubricant is highly directionalized and is axially introduced into the bearing 18 in the clearance space intermediate the retaining member 26 and the inner race 22. The rotation of the ball 24 further forces the fluid to contact the abutting portions of the inner race 22 and the outer race 20 as well as the remaining clearance spaces between the retaining member 26 and the bearing races.

Thus, the present invention provides a lubricant injector which is easily secured to the outer periphery of a turbine shaft and at the same time axially positions the bearing within the turbine housing. In addition, the injector provides a highly directionalized flow of lubricant which reduces resistance of the lubricant flow as well as waste of the lubricant by reflection away from the bearing parts. Moreover, the highly effective lubricant flow is produced by centrifugal force regardless of the direction of rotation of the shaft 16.

Having thus described my invention, many modifications will become apparent to those skilled in the art to which it pertains without departing from the scope and spirit of the present invention as defined in the appended claims.

What is claimed is:

1. A bearing lubrication injector for use in an engine having a housing, a shaft, a ball bearing including an inner race and an outer race for rotatably mounting the shaft in said housing, and a source of lubricant for said bearing, said injector comprising:

a first ring member having a substantially annular cross section coaxially secured to the shaft adjacent the inner race of the bearing, said ring member having an outer ramp surface which increases in diameter toward a first axial end of said first ring member adjacent the inner race;

a second ring member having a substantially annular cross section;

means for coaxially securing said second ring member to said first ring member such that the radially inner surface of said second ring member is radially spaced apart from said ramp surface to thereby define fluid passage means for axially transferring fluid between said radially inner surface and said ramp surface, said passage means having an inlet axially spaced from said inner race and in fluid communication with said source of lubricant; and whereby upon rotation of said shaft, lubricant is centrifugally forced along said ramp surface and axially ejected from between said radially inner surface and said ramp surface into said bearing.

2. The invention as defined in claim 1 wherein said ramp surface is concavely radiused about a point axially aligned with said inlet and radially spaced from said shaft.

3. The invention as defined in claim 2 wherein said second ring member includes a radially inwardly extending dam adjacent said inlet.

4. The invention as defined in claim 3 wherein said dam includes an axially elongated, tapered wall which extends radially outwardly toward said inner race.

5. The invention as defined in claim 3 wherein a second axial end of said first ring member extends axially beyond said dam.

6. The invention as defined in claim 1 wherein the maximum height of said ramp surface above said shaft corresponds with the height of the inner race of the bearing above said shaft.

7. The invention as defined in claim 1 wherein a first axial end of said first ring member abuts against the inner race whereby it axially locks the bearing in position.

8. The invention as defined in claim 7 wherein a first axial end of said second ring is set back from said first axial end of said first ring member a predetermined distance corresponding to the axial end play inherent in the bearing between the retaining member and the races.

* * * * *